United States Patent
Wilson et al.

(10) Patent No.: US 9,528,000 B2
(45) Date of Patent: Dec. 27, 2016

(54) HOT-MIX ASPHALT PAVING MIXTURE

(71) Applicant: Fred Weber, Inc., Maryland Heights, MO (US)

(72) Inventors: Konn E. Wilson, OFallon, MO (US); David B. Marshall, St. Charles, MO (US)

(73) Assignee: Fred Weber Inc., Maryland Heights, MO (US)

( * ) Notice: Subject to any disclaimer, the term of this patent is extended or adjusted under 35 U.S.C. 154(b) by 482 days.

(21) Appl. No.: 14/094,280

(22) Filed: Dec. 2, 2013

(65) Prior Publication Data
US 2015/0152264 A1   Jun. 4, 2015

(51) Int. Cl.
C08L 95/00 (2006.01)
C08K 3/36 (2006.01)
E01C 7/18 (2006.01)

(52) U.S. Cl.
CPC .............. *C08L 95/00* (2013.01); *C08K 3/36* (2013.01); *E01C 7/18* (2013.01);
(Continued)

(58) Field of Classification Search
CPC ........ C08J 11/00; C08J 2395/00; C04B 26/26; C08L 95/00; C09D 195/00; C10C 3/00; E01C 7/00; E01C 7/18; C08K 3/00; C08K 3/36
See application file for complete search history.

(56) References Cited

U.S. PATENT DOCUMENTS 3,206,174 A * 9/1965 Young .................... B01F 7/086
106/277
4,410,589 A 10/1983 Mueller et al.
(Continued)

FOREIGN PATENT DOCUMENTS

CN 101979440 A    6/2011
CN 102093729 A *  6/2011
(Continued)

OTHER PUBLICATIONS

Superpave Binder Materials Selection Procedures (Nov. 30, 2005).*
(Continued)

*Primary Examiner* — Pegah Parvini
*Assistant Examiner* — Alexandra M Moore
(74) *Attorney, Agent, or Firm* — Lawrence E. Laubscher, Sr.; Lawrence E. Laubscher, Jr.; Robert D. Spendlove

(57) ABSTRACT

A hot-mix asphalt paving mixture includes the use of a hard, angular, non-carbonate ½" minus igneous crushed rock, washed rounded No. 100 sieve silica sand particles, ½" minus recycled asphalt pavement particles, and a performance-graded bituminous liquid asphalt binder, thereby to produce an environmentally-friendly hot asphalt mixture that is laid with minimal compaction effort, and without the use of conventional compaction-aiding additives that chemically alter the viscosity of the liquid asphalt binder. During compaction, the rounded silica sand particles react with the igneous rock particles as a mechanical compaction aid, thereby allowing the angular particles to achieve proper aggregate interlock with minimal compactive effort. The aggregate composition comprises about 75% igneous crushed rock, about 5% processed round silica sand particles, about 20% recycled asphalt pavement, and about 5% binder. The resultant pavement is skid-resistant, resists rutting, and has a permanent dark color.

12 Claims, 9 Drawing Sheets

(52) U.S. Cl.
CPC .. *C08K 2201/005* (2013.01); *C08K 2201/014* (2013.01); *C08L 2555/22* (2013.01); *C08L 2555/34* (2013.01); *C08L 2555/52* (2013.01)

(56) References Cited

U.S. PATENT DOCUMENTS

| | | | |
|---|---|---|---|
| 4,443,570 | A | 4/1984 | Draper et al. |
| 5,352,275 | A | 10/1994 | Nath et al. |
| 5,651,637 | A | 7/1997 | Lowe |
| 2003/0091389 | A1 | 5/2003 | Zentner |
| 2011/0233105 | A1 | 9/2011 | Bailey |
| 2012/0167802 | A1 | 7/2012 | Huh |

FOREIGN PATENT DOCUMENTS

| | | | |
|---|---|---|---|
| DE | 102004026867 | | 2/2004 |
| KR | 867688 B1 * | | 5/2008 |
| KR | 895635 B1 * | | 3/2009 |
| KR | 2010122813 A | | 5/2009 |
| RU | 2448994 C2 | | 4/2012 |
| SE | WO 2012175586 A1 * | 12/2012 | .............. C08L 95/00 |

OTHER PUBLICATIONS

Resistance of Compacted Hot Mix Asphalt (HMA) to Moisture-Induced Damage AASHTO Designation: T 283-07 2011.
Theoretical Maximum Specific Gravity and Density of Hot Mix Asphalt (HMA) AASHTO Designation: T 209-11 2011.
Bulk Specific Gravity of Compacted Hot Mix Asphalt (HMA) Using Saturated Surface-Dry Specimens AASHOT Designation: T166-11 2011.
Superpave Volumetric Design for Hot Mix Asphalt (HMA) AASHTO Designation: R-35-09 2011.
Performance-Graded Asphalt Binder AASHTO Designation: M 320-10 2011.
Superpave Mix Design Asphalt Institute Superpave Series No. 2 (SP-2) Third Edition 2001 Printing.
106.3.2.76 TM-76, Acid Insoluble Residue From Engineering Policy Guide Jul. 1, 2010.
Superpave Binder Materials Selection Procedures.

* cited by examiner

PRIOR ART

MISSOURI DEPARTMENT OF TRANSPORTATION – DIVISION OF MATERIALS
PLANT MIX BITUMINOUS BP-1

FIG. 2

PRIOR ART

MISSOURI DEPARTMENT OF TRANSPORTATION – DIVISION OF MATERIALS
ASPHALTIC CONCRETE TYPE SP125C

DATE= 03/08/13  CONTRACTOR = FRED WEBER  SP125 13-7

| IDENT No. | PRODUCT CODE | PRODUCER-LOCATION | BULK SP. GR. | APPAR. SP. GR. | %ABS | FORMATION | LEDGES | % CHERT |
|---|---|---|---|---|---|---|---|---|
| 13SEMA0301 | 100207.PYO | Iron Mtn Trap Rock Pit #3, Iron Mountain, MO | 2.627 | 2.720 | 1.3 | St. Louis | 2-9 | 0.1 |
| 12SJD1R018 | 100205.LD1 | Weber, North Quarry #6, Maryland Heights, MO | 2.623 | 2.718 | 1.4 | St. Louis | 2-9 | 0.1 |
| 13SLB18003 | 100204.LD1 | Weber, North Quarry #6, Maryland Heights, MO | 2.624 | 2.734 |  | St. Louis | 2-9 | 0.1 |
| 13SLB18004 | 1002MS.MSLD | Weber, North Quarry #6, Maryland Heights, MO | 2.682 | 2.721 |  | Porphyry | 1 |  |
| 13SLB18006 | 1002.RAP1 | Weber, North Quarry #6, Maryland Heights, MO | 2.689 | 2.698 |  | RAP | 4.3% AC |  |
| 12EMA0015 | 1002MF.MF | Mississippi Lime Co. 2, Ste. Genevieve, MO | 2.700 | 2.700 |  | Min. Filler |  |  |

FIG. 3A

PRIOR ART

| 13SLMTH043 | 101&CPS..6422 / Phillips 66, Granite City, IL | | | | | | 1.030 | | PG64-22 | Gyro Mold Temp. 290-303°F | | |
|---|---|---|---|---|---|---|---|---|---|---|---|---|
| MATERIAL IDENT# | 13SLB3B002 | 13SLB3B003 | 13SLB3B004 | 13SSEM40004 | 13SLB3B006 | Min. Filler | 13SLB3B002 | 13SLB3B003 | 13SLB3B004 | 13SSEM40004 | 13SLB3B006 | 13SSEM40028 | COMB. |
| 1307 | 1/2" | 3/8" | MAN SAND | MAN SAND | RAP | Min. Filler | | | | | | | GRAD |
| 1 1/2" | 100.0 | 100.0 | 100.0 | 100.0 | 100.0 | 100.0 | 23.0 | 25.5 | 15.0 | 16.0 | 20.0 | 0.5 | 100.0 |
| 1" | 100.0 | 100.0 | 100.0 | 100.0 | 100.0 | 100.0 | 23.0 | 25.3 | 15.0 | 16.0 | 20.0 | 0.5 | 97.6 |
| 3/4" | 100.0 | 100.0 | 100.0 | 100.0 | 100.0 | 100.0 | 23.0 | 25.3 | 15.0 | 16.0 | 20.0 | 0.5 | 65.1 |
| 1/2" | 85.0 | 99.0 | 100.0 | 100.0 | 99.0 | 100.0 | 19.6 | 25.3 | 15.0 | 16.0 | 19.8 | 0.5 | 65.1 |
| 3/8" | 47.0 | 17.0 | 100.0 | 100.0 | 95.0 | 100.0 | 10.8 | 25.2 | 15.0 | 16.0 | 19.0 | 0.5 | 45.1 |
| #4 | 7.0 | 3.0 | 94.0 | 97.0 | 75.0 | 100.0 | 1.6 | 4.3 | 14.1 | 15.5 | 15.0 | 0.5 | 65.1 |
| #8 | 4.0 | 3.0 | 65.0 | 68.0 | 55.0 | 100.0 | 0.9 | 0.8 | 9.8 | 10.9 | 11.0 | 0.5 | 45.1 |
| #16 | 3.0 | 3.0 | 41.0 | 39.0 | 41.0 | 100.0 | 0.7 | 0.8 | 6.2 | 6.2 | 8.2 | 0.5 | 65.1 |
| #30 | 3.0 | 2.0 | 25.0 | 21.0 | 29.0 | 100.0 | 0.7 | 0.5 | 3.8 | 3.4 | 5.8 | 0.5 | 45.1 |
| #50 | 2.0 | 2.0 | 14.0 | 9.0 | 19.0 | 99.0 | 0.5 | 0.5 | 2.1 | 1.4 | 3.8 | 0.5 | 65.1 |
| #100 | 2.0 | 2.0 | 9.0 | 3.0 | 13.0 | 95.0 | 0.5 | 0.5 | 1.4 | 0.5 | 2.6 | 0.5 | 65.1 |
| #200 | 2.0 | 2.0 | 7.0 | 2.0 | 10.0 | 75.0 | 0.5 | 0.5 | 1.1 | 0.3 | 2.0 | 0.4 | 65.1 |

| LABORATORY CHARACTERISTICS AASHTO T-312 | | | | | | | |
|---|---|---|---|---|---|---|---|
| Gmm = 2.476 | % VOIDS = 4.0 | TSR = 80 | TSR Wt. = 3755 | Ndini = 6 | MIX COMPOSITION | | |
| Gmb = 2.378 | V.M.A. = 14.6 | -200/AC = 0.9 | | Ndes = 100 | MIN. AGG. | 95.00% | |
| Gsb = 2.647 | % FILLED = 73 | Gyro Wt. = 4700 | | Nmax = 160 | VIRGIN ASPHALT CONTENT | 4.22 | |
| CALIBRATION NUMBER= 1.3606 | MASTER GUAGE BACK CNT. = 2167 | A1 = -5.437087 | | ASPHALT CONTENT W/RAP | 5.0% | | |
| MASTER GUAGE SER. NO. 2502 | SAMPLE WEIGHT = 7200 | A2 = 3.468823 | | | | | |

Aggregate & Mixture Properties Based on Contractor's Mix Design

FIG. 3B

PRIOR ART

MISSOURI DEPARTMENT OF TRANSPORTATION – DIVISION OF MATERIALS
ASPHALTIC CONCRETE TYPE SP125C

DATE= 02/11/13  CONTRACTOR = FRED WEBER  SP125 13-3

| IDENT. No. | PRODUCT CODE | PRODUCER, LOCATION | BULK SP. GR. | APPAR. SP. GR. | %ABS | FORMATION | LEDGES | % CHERT |
|---|---|---|---|---|---|---|---|---|
| 13SJBJA0301 | 100207.PY2 | Iron Mtn Trap Rock PR #3, Iron Mountain, MO | 2.622 | 2.678 | 0.5 | Porphyry | 1 | |
| 13SJBJ0B02 | 100205.LD1 | Weber, North Quarry #6, Maryland Heights, MO | 2.627 | 2.720 | 1.3 | St. Louis | 2-9 | 0.1 |
| 13SJBJ0B03 | 100204.LD1 | Weber, North Quarry-16, Maryland Heights, MO | 2.623 | 2.718 | 1.4 | St. Louis | 2-9 | 0.1 |
| 13SJBJ0B04 | 100265.LNS1D | Weber, North Quarry-16, Maryland Heights, MO | 2.624 | 2.734 | | St. Louis | 2-9 | |
| 13SJBJ0206 | 1002.RAP1 | Weber, North Quarry #6, Maryland Heights, MO | 2.688 | 2.689 | | RAP | 4.3% AC | |
| 12SJBJA0115 | 1002MF.MF | Mississippi Lime Co. #2, Ste. Genevieve, MO | 2.700 | 2.700 | | Min. Filler | | |

FIG. 4A

PRIOR ART

| MATERIAL IDENT# | 12SLMR016 | 1015ACPC.642ZH | | /Philips 66, Granite City, IL | | | | 1.030 | | P664-22H | | Gyro Mold Temp. 280-310°F | | |
|---|---|---|---|---|---|---|---|---|---|---|---|---|---|---|
| | 13D03 | 13SLE3B001 | 13SLE3B002 | 13SLE3B003 | 13SLE3M4B004 | 13SLE3B006 | Mfn. Filler | 13SEM4D015 | 13SEM4D001 | 13SLE3B002 | 13SLE3B003 | 13SLE3M4B004 | 13SLE3B006 | 13SEM4D015 | COMB. |
| | 3/4" | 1/2" | 3/8" | MFN SAND | RAP | | | | | | | | | GRAD |
| 1 1/2" | 100.0 | 100.0 | 100.0 | 100.0 | 100.0 | 100.0 | | 58.5 | 7.0 | 7.0 | 7.0 | 7.0 | 20.0 | 0.5 | 100.0 |
| 1" | 100.0 | 100.0 | 100.0 | 100.0 | 100.0 | 100.0 | | 58.5 | 7.0 | 7.0 | 7.0 | 7.0 | 20.0 | 0.5 | 100.0 |
| 3/4" | 100.0 | 100.0 | 100.0 | 100.0 | 100.0 | 100.0 | | 58.5 | 7.0 | 7.0 | 7.0 | 7.0 | 20.0 | 0.5 | 100.0 |
| 1/2" | 95.0 | 65.0 | 100.0 | 100.0 | 99.0 | 100.0 | | 55.6 | 6.0 | 6.9 | 7.0 | 6.9 | 19.8 | 0.5 | 95.8 |
| 3/8" | 63.0 | 47.0 | 99.0 | 100.0 | 84.0 | 95.0 | | 48.6 | 3.3 | 6.9 | 7.0 | 5.9 | 19.0 | 0.5 | 85.3 |
| #4 | 52.0 | 7.0 | 17.0 | 85.0 | 41.0 | 75.0 | 100.0 | 30.4 | 0.5 | 1.2 | 6.0 | 2.9 | 15.0 | 0.5 | 54.2 |
| #8 | 31.0 | 4.0 | 3.0 | 41.0 | 25.0 | 55.0 | 100.0 | 18.1 | 0.3 | 0.2 | 2.9 | 1.8 | 11.0 | 0.5 | 34.7 |
| #16 | 18.0 | 3.0 | 3.0 | 25.0 | 19.0 | 41.0 | 100.0 | 10.5 | 0.2 | 0.2 | 1.8 | 1.3 | 8.2 | 0.5 | 22.5 |
| #30 | 12.0 | 3.0 | 2.0 | 14.0 | 13.0 | 29.0 | 100.0 | 7.0 | 0.2 | 0.1 | 1.0 | 0.9 | 5.8 | 0.5 | 15.4 |
| #50 | 6.0 | 2.0 | 2.0 | 9.0 | 10.0 | 19.0 | 99.0 | 4.7 | 0.1 | 0.1 | 0.6 | 0.7 | 3.8 | 0.5 | 10.2 |
| #100 | 5.0 | 2.0 | 2.0 | 7.0 | 7.0 | 13.0 | 95.0 | 2.9 | 0.1 | 0.1 | 0.5 | 0.5 | 2.6 | 0.5 | 6.9 |
| #200 | 4.0 | 2.0 | 2.0 | 7.0 | 5.0 | 10.0 | 75.0 | 2.3 | 0.1 | 0.1 | 0.5 | 0.3 | 2.0 | 0.4 | 5.5 |

| LABORATORY CHARACTERISTICS AASHTO T-312 | 13001 | Gmm = 2.472 | % VOIDS = 4.0 | TSR = 91 | Mini = 8 | MIX COMPOSITION |
| --- | --- | --- | --- | --- | --- | --- |
| | | Gmb = 2.374 | V.M.A. = 14.8 | -200/AC = 1.2 | Ndes = 100 | MIN. AGG. 95.00% |
| CALIBRATION NUMBER= | | Gsb = 2.547 | % FILLED = 73 | Gyro Wt. = 4770 | Nmax = 160 | VIRGIN ASPHALT CONTENT W/RAP 4.2% |
| MASTER GAUGE SER. NO. | 2502 | | | | | |
| | | | MASTER GAUGE BACK CNT. = 2151 | TSR Wt. = 5769 | A1 = -8.654372 | ASPHALT CONTENT 5.0% |
| | | | SAMPLE WEIGHT = 7200 | | A2 = 3.927025 | |

Aggregate & Mixture Properties Based on Contractor's Mix Design

FIG. 4B

FRED WEBER, INC. NORTH ASPHALT FACILITY
Eco-Brown HMA Mix Design (FW #278-EB121-R)

DATE: 05/09/2012  CONTRACTOR: FRED WEBER, INC.  MIX FM #278-EB121-R

| IDENT No. | PRODUCT | PRODUCER-LOCATION | BULK SP. GR. | APPAR. SP. GR. | %ABS | FORMATION | LEDGES | % CHERT |
|---|---|---|---|---|---|---|---|---|
| 12AC0308 | 1/2" Minus | Iron Mountain Trap Rock, Iron Mountain, MO | 2.604 | 2.653 | 0.7 | Rhyolite (Porphyry) | 1 | 0.0 |
| | Silica Sand | Weber, Festus Quarry (Mississippi Sand), Festus, MO | 2.604 | 2.665 | 0.0 | St. Louis | 2-9 | 0.1 |
| | RAP | Weber, North Quarry, Maryland Heights, MO | 2.585 | 2.685 | N/A | RAP | N/A | 4.2% AC |

PG64-22  /Conoco-Phillips, Granite City, IL  1.035  PG64-22 Gyro Mold Temp. 296-306°F  Mixing Temp. 314-325°F

MATERIAL IDENT #

| | 12AC0308 | | | 12AC0308 | | | |
|---|---|---|---|---|---|---|---|
| | 1/2" Minus | Silica Sand | RAP | 1/2" Minus | Silica Sand | RAP | COMB. |
| 1 1/2" | 100.0 | 100.0 | 100.0 | 75.0 | 5.0 | 20.0 | 100.0 |
| 1" | 100.0 | 100.0 | 100.0 | 75.0 | 5.0 | 20.0 | 100.0 |
| 3/4" | 100.0 | 100.0 | 100.0 | 75.0 | 5.0 | 20.0 | 100.0 |
| 1/2" | 95.0 | 100.0 | 99.0 | 71.3 | 5.0 | 19.8 | 96.1 |
| 3/8" | 83.3 | 100.0 | 98.0 | 62.5 | 5.0 | 19.8 | 86.3 |
| #4 | 52.0 | 100.0 | 75.0 | 39.0 | 5.0 | 15.0 | 59.0 |
| #8 | 31.0 | 100.0 | 55.0 | 23.3 | 5.0 | 11.0 | 39.3 |
| #16 | 18.0 | 100.0 | 41.0 | 13.5 | 5.0 | 8.2 | 26.7 |
| #30 | 12.0 | 100.0 | 29.0 | 9.0 | 5.0 | 5.8 | 19.8 |
| #50 | 8.0 | 92.0 | 19.0 | 6.0 | 4.6 | 3.8 | 14.4 |
| #100 | 5.0 | 23.0 | 13.0 | 3.8 | 1.2 | 2.6 | 7.5 |
| #200 | 4.0 | 3.0 | 10.0 | 3.0 | 0.2 | 2.0 | 5.2 |

| LABORATORY CHARACTERISTICS AASHTO T-312 30 Gyration | Gmm = 2.473 "D" | % VOIDS = 4.1 | MIX COMPOSITION | |
|---|---|---|---|---|
| | Gmb = 2.380 "d" | VMA = 14.9 | MIN. AGG. | 94.9% |
| | Gsb = 2.620 | % FILLED = 72.5 | VIRGIN ASPHALT CONTENT | 4.2% |
| | | | TOTAL AC CONTENT | 5.1% |

FIG. 5

PRIOR ART

HOT-MIX ASPHALT PAVING MIXTURE

FIELD OF THE INVENTION

A hot-mix asphalt paving mixture includes the use of a hard, angular, non-carbonate ½" minus igneous crushed rock, washed rounded No. 100 sieve silica sand particles, ½" minus recycled asphalt pavement particles, and a performance-graded bituminous liquid asphalt binder, thereby to produce an environmentally-friendly hot asphalt mixture that is laid with minimal compaction effort, and without the use of conventional compaction-aiding additives that chemically alter the viscosity of the liquid asphalt binder. During compaction, the rounded silica sand particles react with the igneous rock particles as a mechanical compaction aid, thereby allowing the angular particles to achieve proper aggregate interlock with minimal compactive effort.

DESCRIPTION OF RELATED ART

Various types of silica-containing asphalt mixtures for use in roads and the like are well known in the patented prior art. In the Huh published application No. US 2012/0167802, there is disclosed a method for using silica with high percentages of recycled asphalt in a warm mix application. This technology uses a cohesive agent to help combine all the particles of the recycled mix instead of focusing solely on rejuvenating the liquid binder like many other technologies do. This patent mentions the use of silica as a reinforcing agent, but the silica used is a very fine powder and not used as a sand or fine aggregate in the mix. The silica mentioned is also one of many reinforcing agents that can be used which include latex, polymers, rubber, fibers, or organic or inorganic powders. The role of the silica is to allow a higher percentage of total asphalt in the mix without causing rutting or drain-down issues. In the instant invention, on the other hand, silica sand is used as the fine aggregate in the mixture. The interaction between the rounded silica sand and the hard, angular non-carbonate, igneous stone (porphyry) material is what permits the technology of the present invention to outperform conventional asphalt mixtures.

The Müller et al U.S. Pat. No. 4,410,589 discloses mixing 0.1 to 10% by weight of very fine powered silica with liquid asphalt to improve the asphalt coating on the aggregates in the mix. This powdered silica is used to increase the film thickness and allow higher liquid asphalt percentages in the mix without having an issue of the liquid draining down off the rock during delivery and placement. This is similar to how fibers are added to high asphalt mixes. In the present invention, silica sand is used that is not in powdered form. There is little to no dust in the processed washed silica sand, and the purpose of the silica sand is to interact with the hard, angular, non-carbonate igneous (porphyry) material and allow compaction to be achieved with significantly less effort.

In the Korean published application No. KR 895635, an asphalt composition is disclosed including recycled asphalt, and 0.3% to 3% silica fume. The waste silica material is processed from the demolition of coke ovens and is ground down and used as a quartz replacement. The material is broadcast or spread on a hot asphalt pavement so that the reflective properties and sunlight-induced heating of the road surface is reduced. It is scattered on a conventional mix and not used as an aggregate in the mix composition, as distinguished from the present invention wherein the silica sand is produced from sandstone so that the particles are rounded for aiding in the compaction of the mix.

Hot mix asphalt pavement designs normally consist of a combination of coarse and fine aggregates, mineral filler (usually limestone dust), liquid asphalt binder, and when required, chemical liquid additives to mitigate moisture susceptibility (stripping). Other chemical additives can be used to produce the hot mix asphalt at lower temperatures or to aid in compaction by chemically changing the viscosity of the liquid asphalt binder or through other chemical processes performed by the liquid additive.

Non-carbonate aggregates, such as porphyry or rhyolite, are customarily used as skid-resistant aggregates by specification in Missouri and by other state Department of Transportation (DOT) specifications. Mixes produced with limestone as the coarse aggregate portion are prone to polishing under normal traffic loadings. When limestone polishes, it becomes very slick on the surface texture which on high traffic roadways can be problematic as it decreases the safe stopping distance of vehicles, particularly in wet conditions. To mitigate the polishing issue of limestone and other softer aggregates, state and federal DOT specifications generally require that for surface mixes for high-traffic roadways, a minimum amount of skid-resistant aggregate be used for the coarse aggregate portion to ensure proper skid ratings and the safe stopping distance required by the pavement design. It is common that a minimum of 50% by volume of the coarse aggregate be a skid-resistant rock, such as porphyry or rhyolite.

Aggregate selection when designing a mix is generally driven by locally available materials due to the increased cost involved in transporting the aggregate. The coarse aggregates used in most asphalt mixes use limestone or dolomites when it is locally available. This is the most cost effective solution assuming the limestone meets the durability and quality requirements set forth by the governing agency or established by the asphalt institute research to achieve the desired performance in the finished pavement. Most limestone and other carbonate aggregates have been shown to polish and become slick under the vehicular loading applied over time which reduces the skid resistance of the pavement in wet conditions which is undesirable for higher traffic routes. To combat this, non-carbonate coarse aggregates (i.e., non-limestone materials, usually trap rock, granite, diabase, dolerite, etc.) are used in minimal percentages to improve the overall skid resistance of the pavement. It is common for local and state agencies to require a minimum percentage of the coarse aggregate materials (50% by volume of the material larger than a #4 U.S. Standard sieve size) to be a porphyry material or other non-carbonate aggregate.

Rhyolite (trap rock) is a common igneous rock material that is used because it is very dense, hard, durable, and has good anti-polishing properties. The geology of rhyolite is such that during crushing operations, the crushed stone becomes very angular. This angularity has a positive affect on the asphalt mixture as it increases the aggregate interlock between various stones in the asphalt matrix and allows for a durable sound mix that resists rutting. The tradeoff with using large amounts of angular material in a hot-mix asphalt mixture is due to this high angularity of the crushed particles, the mix is very hard to manipulate by hand tools, and requires a much higher compactive effort to achieve satisfactory density in place. This requires the use of heavy rollers or sophisticated pavers, and controlling the lay down temperature is critical to achieve proper density. As the asphalt mixture cools during placement, the mix will reach a point where it will no longer compact and additional vibratory force with the steel drum rollers will start to damage the aggregates in the mix without providing any additional density.

Density in a finished asphalt pavement is one of the most important properties of a pavement's performance. If improper density is achieved, the mix will slowly compact over time under vehicular traffic, and is prone to rutting, shoving and other pavement failures. For this reason, a mix consisting of mostly or all hard, angular, non-carbonate, igneous aggregates such as rhyolite (trap rock) is not feasible, as any benefit that would be achieved by using the higher quality crushed aggregate is negated by poor workability and compact ability during construction.

The asphalt composition of the present invention was developed to overcome this limitation and allow for a mixture to be produced with a high percentage of hard, angular, non-carbonate igneous aggregates such as rhyolite (trap rock) without compromising in place density, workability, and without the addition of an additive that may chemically modify the performance-graded liquid asphalt binder specified for the climate and traffic loading application which can, in some instances, compromise the integrity of the finished pavement.

The technology of the present invention was developed to provide an alternative to commercial asphalt mixes, low-traffic Department of Transportation mixes, and Superpave highway mixes. The technology is designed such that all of the mineral aggregate in the mix is either a recycled product, a by-product of mining operations, or a by-product of silica production in various industries, such as frac sand operations, or raw material for the production of glass. The combination of these unique materials yields a hot asphalt mixture that outperforms conventionally designed mixes in rut resistance, skid resistance, and compactability/workability.

SUMMARY OF THE INVENTION

Accordingly, a primary object of the present invention is to provide a hot-mix asphalt mixture including hard, angular, non-carbonate, igneous crushed rock particles, such as rhyolite or porphyry, that interact with washed rounded silica sand particles to produce an environmentally-friendly hot asphalt mixture that may be constructed in place with minimal compaction effort, and without requiring the addition of conventional additives that chemically alter the viscosity of the liquid asphalt binder, or change the performance grade (PG) of the original liquid asphalt binder.

Another object involves the use of by-product materials in an environmentally-friendly manner while outperforming conventional asphalt mixes for commercial, municipality, and highway use. The ½" minus igneous rock is produced as a by-product during crushing operations at a trap rock quarry. The size No. 100 sieve processed washed round silica sand particles are produced as a by-product of silica sand processing used for industries such as frac sand operations, or raw material for the production of glass. The ½" minus recycled asphalt pavement is produced by the milling of existing asphalt pavements during overlay or construction operations.

Still another object of the invention is to produce a pavement that retains the dark look of freshly paved asphalt over time. Conventional asphalt mixes oxidize over time and slowly change color from the dark black when first placed to a lighter gray colorization. This is due to vehicular traffic wearing off the thin film thickness of liquid asphalt from the surface aggregates and exposing the white or grey colored limestone and other aggregates used in hot mix asphalt mixtures. This aging mechanic by itself does not affect the integrity of an aged asphalt pavement but does pose a concern from an aesthetics standpoint to some municipalities. Since the inventive mixture consists of almost all igneous coarse aggregate, such as rhyolite, which is black in color, the finished pavement retains the dark look of freshly paved asphalt over time. Retaining this darker coloration may also improve the rate at which icy road conditions thaw as the dark pavement will warm faster than a lighter colored one when exposed to prolonged sunlight.

Another object of the invention is to provide an asphalt pavement that has improved skid-resistance properties. Owing to the large percentage of porphyry or rhyolite, the improved mix of the present invention outperforms conventional mixes in rut resistance, skid resistance, compactability, and workability. It can be placed with the same equipment used for municipal and commercial work, and avoids the use of the heavy duty compaction rollers normally required for high-traffic-designed superpave highway mixes.

According to the present invention, the interaction of the hard, angular, non-carbonate, igneous material with the washed rounded silica sand product allows the mix to be placed with minimal compactive effort. The silica sand acts as both a fine aggregate and a compactive aid without having to chemically alter the viscosity or properties of the originally specified liquid asphalt binder. It can be placed with the same equipment used for municipal and commercial work and does not require the heavy duty rollers to compact that is required on high traffic designed mixes, and outperforms standard highway mixes with regard to rut resistance and skid resistance, owing to the large percentage of angular, non-carbonate, igneous rock, such as rhyolite or porphyry, in the mix.

In the prior art, standard hot mix asphalt pavements are customarily compacted with pneumatic tire rollers or steel drum vibratory rollers at a pressure approximately 600 kPa. An initial 15-ton to 20-ton break-down roller compacts the hot mix asphalt in a series of 5 back-and-forth alternating passes with the vibratory system enabled. The break down roller performs the initial compaction of the hot mix as it is spread behind the screed from the paver. A 15-ton to 20-ton intermediate roller compacts the hot mix asphalt with a pattern consisting of 3 to 5 passes. The vibratory system may or may not be used depending, on the percent compaction achieved from the break down roller. This intermediate roller compacts the hot mix asphalt even further once the pavement has cooled approximately 20° F. to 30° F. from initial compaction, with the intent to achieve the design density of the finished pavement. A third finish roller of approximately 5 tons to 10 tons is used to take out any irregularities or cut marks caused by the break down and intermediate rollers during the compaction phase. Finish rolling occurs at approximately 225° F. to 250° F. and does not significantly increase the overall density of the pavement.

On the other hand, the pavement mixture of the present invention requires much less compactive effort during construction to achieve the minimum specified density, owing to the interaction between the rounded silica sand particles with the hard, angular, non-carbonate igneous stone. The inventive mixture is compacted with a 10-ton to 20-ton steel wheel vibratory roller, which serves as the initial break-down roller. Compaction takes place between 275° F. and 330° F. A total of 3 to 5 passes alternating the vibration on and off per pass provides a sufficient in place density of 91.5% of the theoretical maximum specific gravity of the mixture (Gmm) as denoted on the job mix formula. An intermediate roller is generally not required to achieve the additional compaction as is common with traditional mixes due to the compaction aid properties of the silica sand. A finish roller of between 2 tons and 10 tons is then used to take out any surface irregularities caused by initial compaction. The interaction between the rounded ultra fine silica sand particles with the hard, angular, non-carbonate, igneous particles such as porphyry, allow for ease of compaction and workability. This allows for smaller paving crews and municipality workers to place this mix and achieve the same high performance of highway superpave mixes. Owing to its durability, the inventive mix can be used on higher traffic routes and highway applications.

The interaction of the rounded particle silica sand with the angular crushed rock material is used to perform a task that previously would involve adding additional mineral fillers, uncrushed fine aggregates, or chemical additive modifiers. Chemically modifying the liquid asphalt binder with additives designed to aid compaction in some cases has been shown to reduce the performance characteristics of the binder at both the high temperature rating where rutting may occur as well as the low temperature range where cold weather cracking is possible. By leaving the performance graded liquid asphalt at the specified PG grade without the use of chemical additives to aid compaction, the technology of the present invention solves the compact ability/workability problem without taking any unnecessary risks with the performance of the liquid binder.

BRIEF DESCRIPTION OF THE DRAWINGS

Other objects and advantages of the invention will become apparent from a study of the following specification, when viewed in the light of the accompanying drawing, in which:

FIGS. 2, 3A and 3B, and 4A and 4B are specification charts for three of the prior art tested mixtures of FIG. 1;

FIG. 5 is the specification chart for the inventive mixture of FIG. 1;

DETAILED DESCRIPTION OF THE INVENTION

Figure 1:
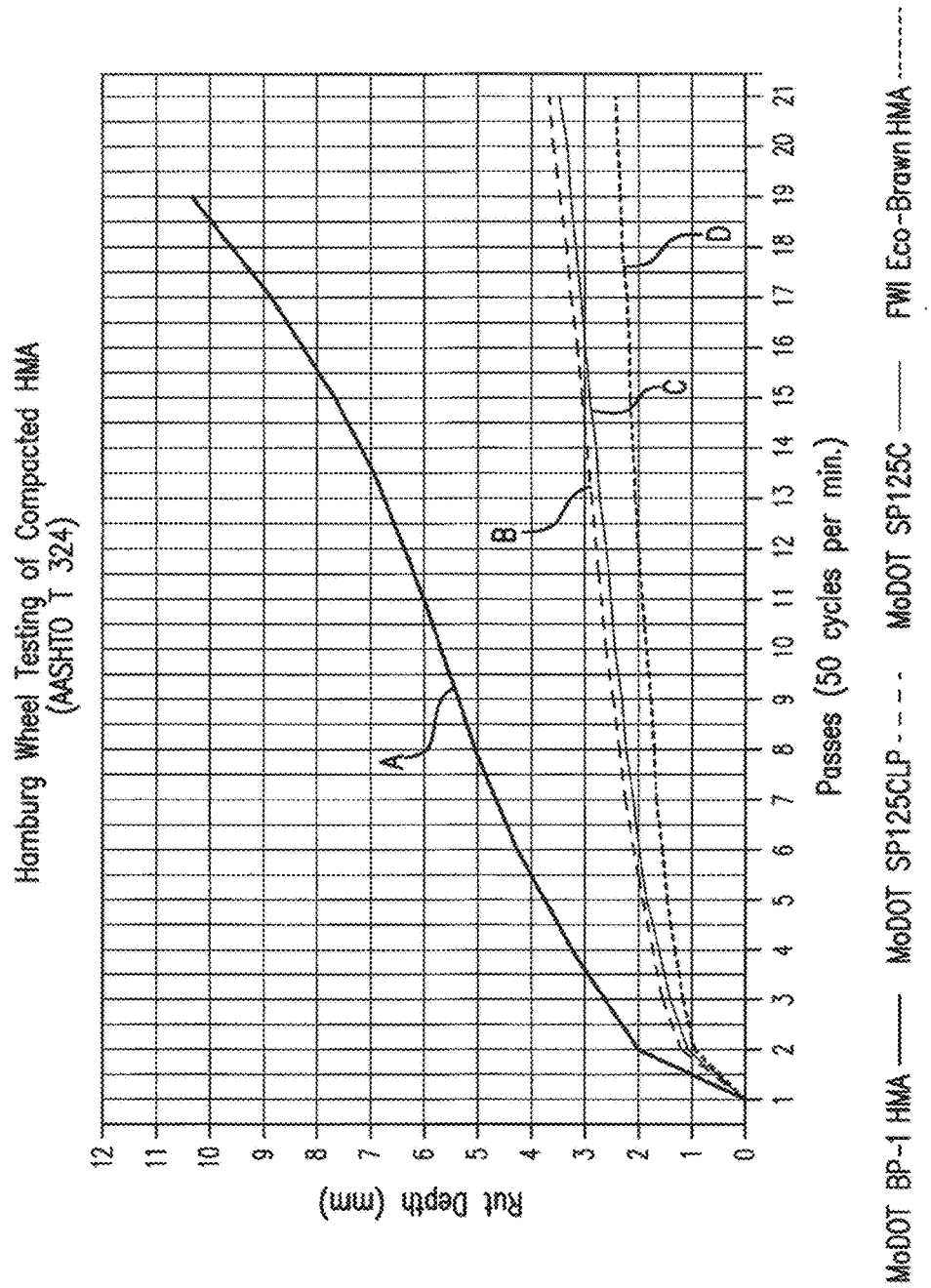
FIG. 1 is a graph illustrating the Hamburg Wheel Testing comparisons of rut depth versus wheel passes for various compacted asphalt mixtures.

Briefly, the aggregate composition of the present invention comprises about 75% hard, angular, non-carbonate ½" minus igneous crushed rock, such as rhyolite or porphyry, about 5% washed processed rounded #100 sieve silica sand, and about 20% ½" minus recycled asphalt pavement (RAP). A suitable performance-graded bituminous liquid asphalt binder is added to the aggregate composition to produce a hot-mix asphalt paving mixture.

Mix Specifications

More particularly, the inventive mixture comprises the following composition and acceptable range of each component material, by weight:

| | |
|---|---|
| (a) Hard, angular, non-carbonate, igneous crushed rock | 70%-80% |
| (b) Washed, processed silica sand | 3%-10% |
| (c) Recycled Asphalt Pavement (RAP) | 20%-25% |
| (d) Virgin or new asphalt binder | 3.5%-5.5% |
| (e) Combined total asphalt binder | 4%-7% |

Igneous Crushed Stone

The non-carbonate igneous crushed rock has an acid insoluble residue (AIR) of at least 85 percent insoluble residue. Examples of the igneous rock are rhyolite, porphyry, granite, diabase, dolerite, and basalt. The hard, angular, non-carbonate, igneous crushed rock is produced as a by-product of a normal crushing operation, such as that occurring at a trap rock quarry during the production of railroad ballast and various clean crushed aggregate products for use in construction applications. While producing the clean-sized products, the ½" minus material is produced as a by-product of the screening operations. A typical example is the Iron Mountain Trap Rock operation, located in Iron Mountain, Mo.

Silica Sand

The washed, processed rounded-particle silica sand used in the mixture of the present has a chemical composition consisting of at a minimum of 99 percent silica by weight, and conforms to the size distribution as follows:

| U.S. Standard Sieve Size | Percent Passing by Weight |
|---|---|
| No. 30 | 100% |
| No. 50 | 85%-100% |
| No. 100 | 20%-50% |
| No. 200 | 0%-6% |

The silica sand is the by-product of silica sand processing used for industries such as frac sand operations, or raw material for the production of glass. Sandstone is crushed and processed in a wet wash plant that sizes the sand grains to meet the tolerance of the frac sand being produced. The by-product of this process is a washed silica sand product that is too small to be used as frac sand but is very consistent in size and is dust free.

Recycled Asphalt Pavement (RAP)

The recycled asphalt pavement (RAP) material is processed to a homogeneous gradation, and is free of deleterious and other foreign material. Recycled asphalt pavement (RAP) is common in all types of asphalt mixes. RAP is produced from the milling of existing asphalt pavements during overlay or construction operations and is then processed so that it is ½" minus size. This ½" minus RAP contains durable aggregates that were used in the previous mix, as well as approximately 5% asphalt binder that, when reheated and reused in a new mix, reduces the amount of new liquid asphalt required in the mixture.

Virgin Asphalt Binder

The bituminous performance-graded asphalt binder (PG Grade) is chosen in accordance with the climate and traffic condition for which the inventive mixture is to be produced and used. The criteria for choosing the appropriate PG graded asphalt binder is outlined in the Superpave Mix Design Method used for standard gyratory designed mixes.

The Aggregate Composition

The total combined aggregate composition, prior to mixing with the specified performance graded asphalt binder, has the following size distribution:

| U.S. Standard Sieve Size | Percent Passing by Weight |
| --- | --- |
| ¾ Inch | 100% |
| ½ Inch | 85%-100% |
| No. 4 | 50%-70% |
| No. 8 | 30%-55% |
| No. 30 | 10%-30% |
| No. 200 | 5%-12% |

The unique interaction between the round dust free-silica sand particles with the hard, angular, non-carbonate, igneous particles in the inventive mixture requires much less compactive effort to achieve proper aggregate interlock between the coarse aggregate particles. The rounded particles mechanically interact with the angular pieces by acting as small ball bearings which allow the angular faces of the aggregate pieces to move, realign, and compact in order to achieve proper field density easily during compaction in the field.

The aggregate composition uses a small amount of the crushed, washed rounded silica sand particles as a compactive aid to allow the mix to be compacted with the same minimal effort used on commercial grade mixes (30 gyrations with the Superpave Gyratory Compactor during design) while still achieving the high performance skid resistance of a Superpave mixture. The silica sand is sized so that most particles are in the range of the #100 sieve and dust free. The particles themselves are very rounded and act like ball bearings when the mixture is hot, thereby allowing the angular, non-carbonate, igneous rock to move and align itself during compaction so that the required density is achieved much easier than an angular, non-carbonate, igneous rock and limestone only mix. This interaction of the very small round silica sand particles with the angular aggregates makes the inventive composition unique, since no chemical additives are required to be added to the liquid asphalt binder to aid in the compaction of the hot asphalt mix.

The inventive mixture, when samples are laboratory-tested in accordance with AASHTO T 312 *"Preparing and Determining the Density of Hot Mix Asphalt (HMA) Specimens by Means of the Superpave Gyratory Compactor"*, at a design level of 30 gyrations, has the following mixture characteristics:

| | |
| --- | --- |
| (a) Percent Air voids | 3.5%-4.5% |
| (b) Voids in the Mineral Aggregate (VMA) | 14.0% Minimum |
| (c) Voids filled with Asphalt (VFA) | 60%-80% |

When samples of the inventive mixture are laboratory-tested in accordance to AASHTO T 283 *"Resistance of Compacted Hot Mix Asphalt (HMA) to Moisture-Induced Damage"*, the moisture susceptibility has a minimum tensile strength ratio of 80%.

Method Steps

The inventive mixture is produced from a batch style, or rotary-drum-mixing hot-mix asphalt plant that is calibrated to weigh or meter all raw materials in accordance with local DOT agency specifications for approved asphalt plants, and in accordance with AASHTO M 156 *"Requirements for Mixing Plants for Hot-Mixed, Hot-Laid Bituminous Paving Mixtures"*.

All raw materials are mixed sufficiently to obtain a homogenous product at a mixing temperature of 314° F. to 335° F. prior to discharge into any hauling equipment. Trucks used for hauling the inventive mixture preferably have tight, clean, smooth, metal beds that are thinly coated with a minimum quantity of lime solution, or other approved bituminous mixture release agent, in order to prevent the mixture from adhering to the beds. Use of diesel fuel, fuel oil, or other detrimental products as a bed coating or dilution agent shall not be permitted as it may affect performance of the final compacted pavement. Trucks normally have a cover of canvas or other suitable material of such a size to protect the mixture from the weather. The cover is securely fastened to all sides of the truck bed to minimize temperature loss during transport. When appropriate, insulated beds should be used so that the mixture is delivered to the paver at the appropriate compaction temperature of 295° F. to 320° F.

The inventive mix is placed with a standard bituminous paver. The paver is generally a self-contained unit, provided with an activated screed or strike-off assembly, heated if necessary, and capable of spreading and finishing asphaltic concrete in lane widths applicable to the specified typical sections and thicknesses required. Best practices should be taken to minimize or eliminate natural segregation that can occur during transport of any hot mix asphalt mixtures so the finished pavement is homogeneous and free from irregularities.

As compared to the paving efforts of the asphalt pavements of the prior art, the pavement mixture of the present invention requires much less compactive effort during construction to achieve the minimum specified density, owing to the interaction between the rounded silica sand particles with the hard, angular, non-carbonate igneous stone. The inventive mixture is compacted with a 10-ton to 20-ton steel wheel vibratory roller, which serves as the initial breakdown roller. Compaction takes place between 275° F. and 330° F. A total of 3 to 5 passes alternating the vibration on and off per pass provides a sufficient in place density of 91.5% of the theoretical maximum specific gravity of the mixture (Gmm) as denoted on the job mix formula. An intermediate roller is generally not required to achieve the additional compaction as is common with traditional mixes due to the compaction aid properties of the silica sand. A finish roller of between 2 tons and 10 tons is then used to take out any surface irregularities caused by initial compaction.

Rut Depth versus Wheel Pass Comparison Testing

The mixture of the present invention is produced with about 75% of the mineral aggregate as igneous material, for example, porphyry or rhyolite. These materials (commonly termed "trap rock") are used as a skid-resistant aggregate by specification in Missouri and by other state Department of Transportation specifications. Mixes produced with limestone as the coarse aggregate portion are prone to polishing under normal traffic loadings. When limestone polishes, it becomes very slick on the surface texture which on high traffic roadways can be problematic as it decreases the safe stopping distance of vehicles, particularly in wet conditions. To mitigate the polishing issue of limestone and other softer aggregates, State and Federal DOT specifications usually require that for surface mixes on high traffic roadways, a minimum amount of skid-resistant aggregate be used for the coarse aggregate portion to ensure proper skid ratings and the safe stopping distance required by the pavement design. It is common that a minimum of 50% by volume of the coarse aggregate be a skid resistant rock such as porphyry. The mixture of the present invention has over 87% of the plus #4 sieve size (coarse aggregate) as porphyry with the only limestone materials of that size coming from the recycled asphalt used in the mix.

The trap rock or porphyry material used in the instant invention is also a very hard and angular material due to the mineral composition and how it crushes. This angularity, particularly in the finer or smaller sized pieces increases the durability and VMA (voids in the mineral aggregate) of the mixture. The aggregate interlock between these angular particles once compacted allows the mix to be extremely rut resistant. Testing performed using the Hamburg Rut Wheel Tester shows that the mixture of the instant invention outperforms conventional MoDOT mixes as well as the high traffic level superpave mixes.

The high percentage of hard, angular, non-carbonate, aggregate such as porphyry material allows the mixture to be very durable and rut resistant, but this occurs at the expense of ease of compaction and workability. Highway mixes that utilize 50% porphyry for its skid resistant properties are designed at a much higher compactive effort. This is usually in the range or 100 gyrations with the superpave gyratory compactor in the laboratory. When placing the material in the field, a minimum of 3 steel wheel rollers are needed to ensure sufficient compaction is achieved. The compaction becomes very dependent on temperature and it must be monitored during placement to achieve the design level of compaction or densification.

During laying of the inventive mixture, samples are laboratory-tested with 30 gyrations of the Superpave Gyratory Compactor, which is the design compactive effort for light-duty mixes, yet it outperforms those designed at 100 gyrations for heavy-duty highway applications. This is illustrated in FIG. 1 by using a Hamburg Rut Wheel Tester to compare the inventive mixture (curve D) with a conventional low volume mix (curve A), and two highway volume superpave mixes (curves B and C).

The lower design gyrations of the inventive mix are important, as they allow for proper placement and handling of the material during construction, using smaller less-sophisticated equipment and crews than are required to place highway grade superpave mixes. This ability to achieve compaction with much less equipment while outperforming the standard superpave highway mixes on rut resistance, durability, and skid resistance places the inventive technology into a new class of high performing pavements that was previously unavailable for commercial, municipal applications, or highway construction.

Laboratory specimens were prepared to compare the rut resistance properties of the inventive hot mix asphalt with other dense graded mixes utilizing the same nominal max aggregate size. Four mixes—i.e., MoDOT BP-1 (curve A; chart of FIG. 2), MoDOT SP125C (curve B; chart of FIG. 3), MoDOT SP125CLP (curve C; chart of FIG. 4), and the inventive mix (curve D; chart of FIG. 5) with the same RAP percentage, the same asphalt grade (PG64-22), and similar combined gradations—were tested according to AASHTO T 324, *"Hamburg Wheel Testing of Compacted Hot Mix Asphalt"*, and the rutting/fatigue characteristics of these four mixes were compared.

Figure 6:
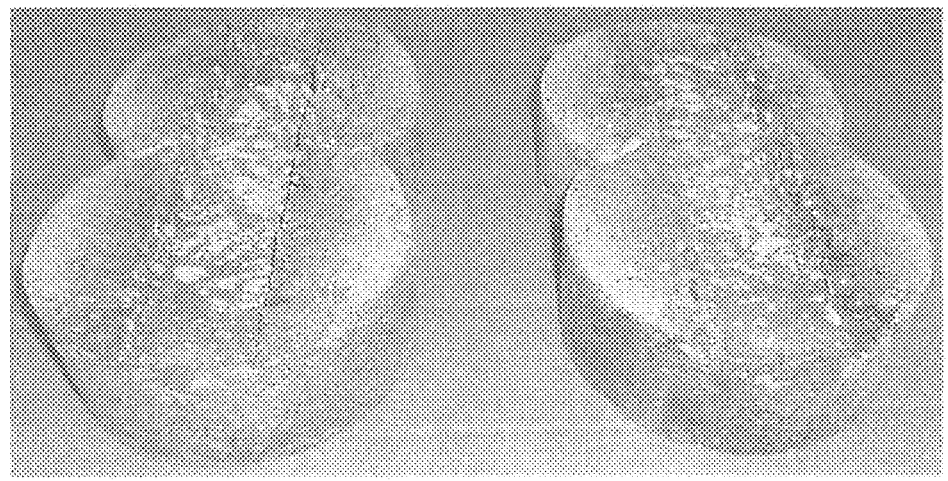
FIGS. 6 and 7 and photographs of the three tested prior art mixtures of FIG. 1.

As shown in the photograph of FIG. 6 showing the MoDOT BP-1 mixture post testing, the rut depth was over 10 mm at approximately 18,000 passes, at which point no additional passes of the Hamburg Wheel were made.

Figure 7:
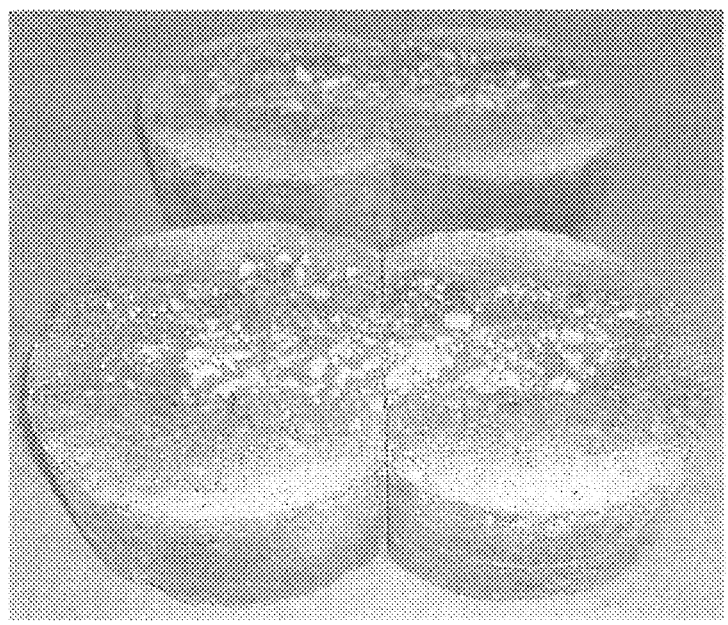

The SP125C HMA mix (top product of the photograph of FIG. 7), which is designed for an equivalent single axle load (ESALs) of between 3,000,000 and 30,000,000, was tested using the Hamburg rut wheel tester. This is a highway surface mix for applications that do not require skid resistant aggregates. The rut depth was approximately 3.4 mm after the 20,000 passes. The SP125CLP mix (bottom product of the photograph of FIG. 7), which is designed for an equivalent single axle load (ESALs) of between 3,000,000 and 30,000,000 was tested using the Hamburg rut wheel tester. This is a highway surface mix for applications that do require skid resistant aggregates. The design specifications require that a minimum of 50% by volume of the coarse aggregate (material larger than the #8 Sieve) be crushed porphyry (trap rock). The rut depth was approximately 3.7 mm after the 20,000 passes.

Figure 8:
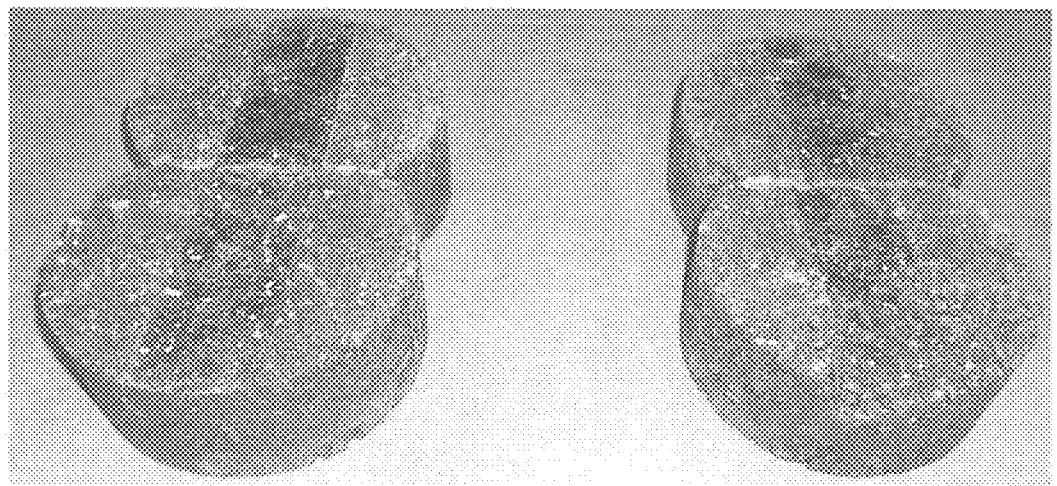
FIGS. 8 and 9 are photographs of the tested inventive mixture of FIG. 1.
Figure 9:
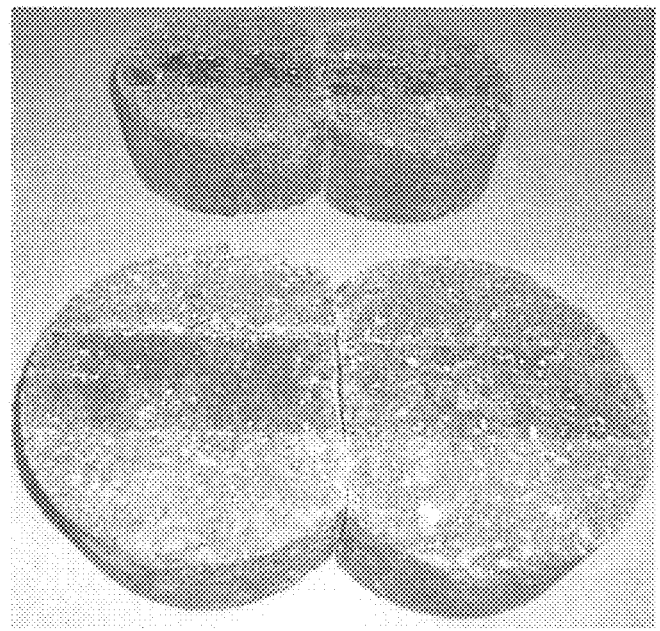

In the photographs of FIGS. 8 and 9, the inventive mixture is illustrated after testing. The rut depth was at 2.4 mm at approximately the full 20,000 passes.

As detailed by the photos of the tested specimens and the test data, the mixture of the present invention outperformed the MoDOT BP-1 mix equivalent by a large margin. Very minimal distress is evident on the inventive mix samples, which is indicative of the high rut resistant properties of the mix. When compared with both Superpave mixes, the inventive mix had less rutting after the 20,000 cycles of the Hamburg Rut Tester. This is especially noteworthy as the design gyrations for the inventive mix is at 30 gyrations with the Superpave gyratory compactor, while the C level Superpave mixes use an Ndes=100.

The inventive mix requires much less compactive effort than a "C" level Superpave to achieve proper field density while still outperforming the Superpave mixes on rut resistance. This leads to a much more workable mix for a variety of applications other than mainline highway paving where a strict rolling pattern with multiple steel wheel rollers are necessary for sufficient compaction. The mix is a more durable rut-resistant mix, and encounters much less fatigue-related issues than the comparable dense graded mixes when placed with proper compaction and appropriate mat thicknesses in accordance to the applicable pavement design. This high performance mix provides added longevity and increased performance when used in lieu of a BP-1 or equivalent mix. The inventive mixture is also a suitable replacement for highway level mixes such as SP125C and SP125CLP. The inventive technology uses by-product materials, so that it is environmentally friendly while outperforming conventional asphalt mixes for commercial, municipality use, and highway construction.

The interaction of the hard, angular, non-carbonate, igneous material such as porphyry with the washed rounded silica sand product allows the mix to be placed with minimal compactive effort. The silica sand acts as both a fine aggregate and a compactive aid without having to use chemical additives to alter the viscosity of the liquid asphalt binder to aid compaction. It can be placed with the same equipment used for municipal and commercial work and does not require the heavy duty rollers to compact that is required on high traffic designed mixes but will outperform the highway mixes as far as rut resistance and skid resistance due to the large percentage of hard, angular, non-carbonate, igneous, aggregate such as porphyry (trap rock) in the mix.

The mix composition of the present invention affords a high performance alternative to commercial asphalt mixes, low-traffic DOT mixes, and standard highway level mixes. The inventive technology is designed such that all of the mineral aggregate in the mix is either a recycled product, a by-product of mining operations, or a by-product of silica sand processing used for industries such as frac sand operations, or raw material for the production of glass. The combination of these unique materials yields a hot asphalt mixture that outperforms conventional mixes in rut resistance, skid resistance, and compactability/workability.

While in accordance with the provisions of the Patent Statutes the preferred forms and embodiments of the invention have been illustrated and described, it will be apparent to those skilled in the art that changes may be made without deviating from the invention described above.

What is claimed is:

1. A hot-mix asphalt paving mixture for producing a given resultant pavement, comprising:
(a) an aggregate composition including, by weight:
(1) 70% to 80% hard angular non-carbonate crushed igneous rock having a size of about ½" minus, said igneous crushed rock being selected from the group consisting of rhyolite, porphyry, granite, diabase, and basalt;
(2) 3% to 10% washed processed rounded silica sand, wherein about 85% to 100% of said silica sand, by weight, has a size distribution in the passing range of a Size No. 50 U.S. Standard Sieve; and
(3) 20% to 25% recycled asphalt pavement (RAP) having a size distribution less than ½" minus; and
(b) a performance-graded virgin asphalt bituminous binder having an initial temperature of about 314° F. to 335° F., thereby to produce a hot-mix asphalt paving mixture, the quantity of said performance-graded virgin asphalt bituminous binder being from 3.5% to 5.5%, by weight, of said hot-mix asphalt paving mixture, whereby said given resultant pavement is skid-resistant, rut-resistant, and has a permanent black appearance.

2. A hot-mix asphalt paving mixture as defined in claim 1, wherein said silica sand is dust-free and has a chemical composition consisting of at a minimum of 99 percent silica by weight, and conforms to the size distribution of 20% to 50%, by weight, silica sand passing through a Size No. 100 U.S. Standard Sieve.

3. A hot-mix asphalt paving mixture as defined in claim 1, wherein said aggregate composition has the size dimensions:

| U.S. Standard Sieve Size | Percent Passing by Weight |
|---|---|
| ¾ Inch | 100% |
| ½ Inch | 85%-100% |
| No. 4 | 50%-70% |
| No. 8 | 30%-55% |
| No. 30 | 10%-30% |
| No. 200 | 5%-12%. |

4. A hot-mix asphalt paving mixture as defined in claim 1, wherein said recycled asphalt pavement includes an asphalt pavement binder, the sum of said asphalt pavement binder and said performance-graded virgin asphalt bituminous binder being between 4% and 7% by weight of said hot-mix asphalt mixture.

5. A hot-mix asphalt paving mixture as defined in claim 4, wherein said performance-graded asphalt bituminous binder is selected from the group consisting of PG64-22, PG64-22H, PG64-22V, PG70-22, and PG76-22 performance-graded asphalt binder, whereby the given resultant pavement including said binder corresponds with the climate and expected traffic conditions.

6. A hot-mix asphalt paving mixture as defined in claim 5, wherein the mixture characteristics of a laboratory-tested specimen of the combined hot-mix asphalt paving mixture, at a design level of 30 gyrations, are such that, by volume:
(a) the laboratory air voids value is between 3.5% and 4.5%;
(b) the voids in the mineral aggregate value (VMA) is at least 14.0%; and
(c) the voids filled with asphalt value (VFA) is between 60% and 80%.

7. A hot-mix asphalt paving mixture as defined in claim 6, wherein said hot-mix asphalt paving mixture, when tested for moisture susceptibility, has a minimum tensile strength ratio of about 80%.

8. A hot-mix asphalt paving mixture as defined in claim 1, wherein said crushed igneous rock consists of recycled material produced as a by-product during quarry and mining operations.

9. A hot-mix asphalt paving mixture as defined in claim 1, wherein said silica sand is produced as one of the group consisting of a by-product of mining operations, a by-product of silica sand processing used for industries such as frac sand operations, and raw material for the production of glass.

10. A hot-mix asphalt paving mixture as defined in claim 1, wherein said hot-mix asphalt paving mixture is compacted by a total of 3 to 5 passes by a 10-ton to 20-ton wheel vibratory roller at a temperature of between 275° F. to 330° F., thereby to produce desired field density of 91.5 of the theoretical maximum specific gravity of the hot-mix asphalt paving mixture, whereby owing to the improved workability and compactability produced by the interaction between the rounded silica sand particles and the hard angular non-carbonate crushed igneous rock in the hot-mix asphalt pavement mixture, said given resultant pavement has improved skid- and rut-resistance.

11. A method for making asphalt paved roads, which comprises:
(a) mixing together to form an aggregate composition, by weight:
(1) 70% to 80% hard angular non-carbonate crushed igneous rock having a size of about ½" minus, said igneous rock being selected from the group consisting of rhyolite, porphyry, granite, diabase, and basalt;
(2) 3% to 10% washed processed rounded silica sand, wherein about 85% to 100% of said silica sand, by weight, has a size distribution in the passing range of a Size No. 50 U.S. Standard Sieve; and
(3) 20% to 25% recycled asphalt pavement having a size distribution of about ½" minus; and
(b) mixing with said aggregate composition a performance-graded virgin bituminous asphalt binder having an initial temperature of about 314° F. to 335° F., thereby to produce a hot-mix asphalt paving mixture, the quantity of said performance-graded virgin asphalt bituminous binder being from 3.5% to 5.5%, by weight, of said hot-mix asphalt paving mixture, whereby the mixture is easily compacted, and the resultant pavement is skid-resistant, rut-resistant, and has a permanent black appearance;
(c) placing said asphalt mixture within a conventional bituminous hot-mix paver;
(d) depositing said asphalt mixture in a homogeneous manner to a desired lane width and thickness; and
(e) initially compacting said mixture at a temperature of from 275° F. to 325° F. and at a pressure of about 600 kPa by between 3 to 5 passes with a 10-ton to 20-ton steel drum vibratory roller, thereby to achieve at least 91.5% of a desired theoretical maximum specific gravity.

12. A method for making asphalt paved roads as defined in claim 11, and further including the step of:
(f) subsequently compacting said asphalt mixture by means of a 2-ton to 10-ton steel drum finishing roller, thereby to remove any surface irregularities produced by the initial compacting step.

* * * * *